(12) United States Patent
Takaoka et al.

(10) Patent No.: US 9,896,553 B2
(45) Date of Patent: Feb. 20, 2018

(54) METHOD FOR MANUFACTURING RUBBER COMPOSITION, RUBBER COMPOSITION, VULCANIZED RUBBER, AND TIRE

(71) Applicant: BRIDGESTONE CORPORATION, Chuo-ku, Tokyo (JP)

(72) Inventors: Saaya Takaoka, Kodaira (JP); Hideko Akai, Yokohama (JP); Sachiko Sawada, Yokohama (JP); Hiroyuki Nagatani, Koto-ku (JP); Go Banzashi, Koto-ku (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 14/772,157

(22) PCT Filed: Mar. 14, 2014

(86) PCT No.: PCT/JP2014/056949
§ 371 (c)(1),
(2) Date: Sep. 2, 2015

(87) PCT Pub. No.: WO2014/142316
PCT Pub. Date: Sep. 18, 2014

(65) Prior Publication Data
US 2016/0009877 A1    Jan. 14, 2016

(30) Foreign Application Priority Data

Mar. 14, 2013    (JP) .................................. 2013-051532

(51) Int. Cl.
| | |
|---|---|
| *B60C 1/00* | (2006.01) |
| *C08J 5/04* | (2006.01) |
| *C08J 3/20* | (2006.01) |
| *C08L 7/00* | (2006.01) |
| *C08L 21/02* | (2006.01) |

(52) U.S. Cl.
CPC .................. *C08J 5/045* (2013.01); *B60C 1/00* (2013.01); *C08J 3/20* (2013.01); *C08L 7/00* (2013.01); *C08L 21/02* (2013.01); *C08J 2307/00* (2013.01); *C08J 2401/02* (2013.01)

(58) Field of Classification Search
CPC ....... B60C 1/00; B60C 1/0008; B60C 1/0016; B60C 1/0025; B60C 1/0041; C08J 3/20; C08J 5/04; C08J 5/041; C08J 5/042; C08J 5/043; C08J 5/044; C08J 5/045; C08J 5/046; C08J 5/047
USPC ...................................................... 523/333
See application file for complete search history.

(56) References Cited

U.S. PATENT DOCUMENTS

| | | |
|---|---|---|
| 2,613,190 A | 1/1951 | Feigley, Jr. et al. |
| 4,514,541 A | 4/1985 | Frances |
| 5,213,866 A | 5/1993 | Swope et al. |

FOREIGN PATENT DOCUMENTS

| | | |
|---|---|---|
| CN | 1052274 A | 6/1991 |
| EP | 0 426 024 A2 | 5/1991 |
| JP | 60-255826 A | 12/1985 |
| JP | 10-7811 A | 1/1998 |
| JP | 2002-503621 A | 2/2002 |
| JP | 2005-75856 A | 3/2005 |
| JP | 2005-133025 A | 5/2005 |
| JP | 2006-193620 A | 7/2006 |
| JP | 2009-84564 A | 4/2009 |
| JP | 2009-263417 A | 11/2009 |
| JP | 2011-102451 A | 5/2011 |
| JP | 2011-105841 A | 6/2011 |
| JP | 2012-25949 A | 2/2012 |
| JP | 2013-18918 A | 1/2013 |
| JP | 2013-204010 A | 10/2013 |
| SU | 1526180 A1 | 7/1992 |

OTHER PUBLICATIONS

JP 2011/102451 (2011) Machine translation.*
International Search Report for PCT/JP2014/056949 dated Jun. 3, 2014.
Communication dated Feb. 15, 2016 from the European Patent Office in counterpart application No. 14764653.3.
Communication dated Oct. 10, 2016 from the State Intellectual Property Office of the P.R.C. In counterpart Chinese application No. 201480014941.9.

(Continued)

*Primary Examiner* — Edward Cain
(74) *Attorney, Agent, or Firm* — Sughrue Mion, PLLC

(57) ABSTRACT

Provided are a method for manufacturing a rubber composition, which method can give a rubber composition provided with excellent reinforcement properties by improving the dispersibility of fibers in a rubber component when the fibers are added to the rubber, a rubber composition obtained using this method, a vulcanized rubber, and a tire. The method is a method for manufacturing a rubber composition comprising short fibers, comprising a dispersion preparation step for preparing a short fiber dispersion by adding the short fibers into a liquid, a mixed dispersion preparation step for preparing a mixed dispersion by adding at least one dispersant selected from the group consisting of carbon black and inorganic compounds into the short fiber dispersion, a mixing step for mixing the mixed dispersion and rubber latex to prepare a rubber-short fiber mixed solution, and a drying step for drying the rubber-short fiber mixed solution to give a rubber composition.

4 Claims, 1 Drawing Sheet

(56) References Cited

OTHER PUBLICATIONS

"Asbestos Fibers", Concise Encyclopedia of Composite Materials Revised Edition, Edit. Anthony Kelly, Jan. 1, 1994, XP009194847, pp. 18-21 (total 5 pages).
Communication dated Jul. 13, 2017 from the European Patent Office in counterpart Application No. 14 764 653.3.

* cited by examiner

[Fig.1]
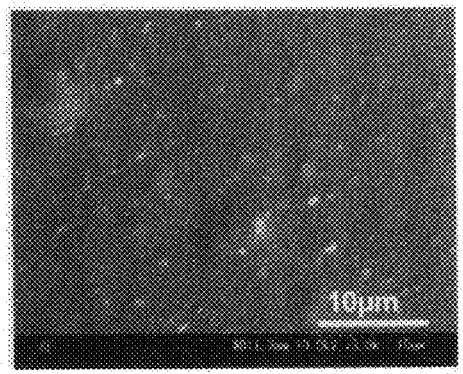
[Fig.2]
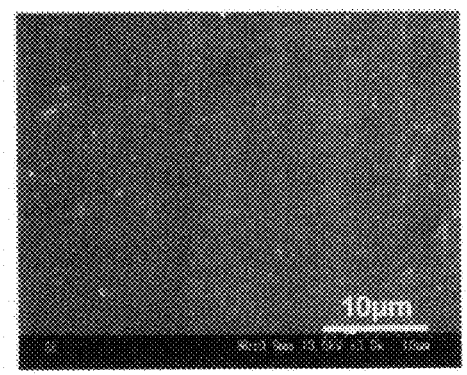
[Fig.3]
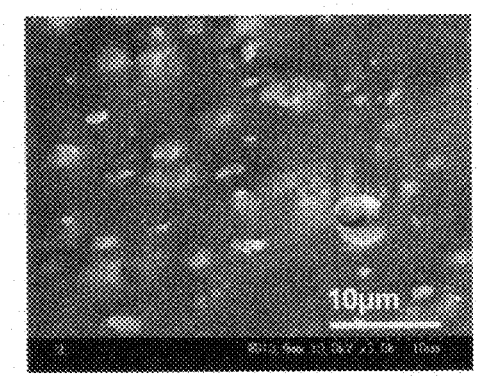

METHOD FOR MANUFACTURING RUBBER COMPOSITION, RUBBER COMPOSITION, VULCANIZED RUBBER, AND TIRE

CROSS REFERENCE TO RELATED APPLICATIONS

This application is a National Stage of International Application No. PCT/JP2014/056949 filed Mar. 14, 2014, claiming priority based on Japanese Patent Application No. 2013-051532, filed Mar. 14, 2013, the contents of all which are incorporated herein by reference in their entirety.

TECHNICAL FIELD

The present invention relates to a method for manufacturing a rubber composition (hereinafter also referred to simply as "manufacturing method"), a rubber composition, a vulcanized rubber, and a tire, and particularly to a method for manufacturing a rubber composition comprising short fibers, a rubber composition obtained using the same, a vulcanized rubber, and a tire including the same.

BACKGROUND ART

Techniques are conventionally known in which fibers are mixed with rubber used for rubber goods, such as tires, to improve properties such as hardness and modulus. In such techniques, fibers with a large fiber diameter tend to disperse well in rubber but reduce rubber physical properties such as fatigue resistance, whereas fibers with a small fiber diameter tend to improve the fatigue resistance but be entangled with each other and disperse poorly in rubber.

Against this, there is proposed mixed yarn fibers having a sea-island cross-section, which are dispersed in rubber and become fibrillated by a shearing force at mixing to increase the area of contact with rubber, whereby both dispersibility and fatigue resistance can be achieved (see Patent Document 1). These fibers, however, form a sea-island structure due to phase separation of resin and therefore have ununiform thicknesses and lengths, and have diameters as large as 1 μm and 0.7 μm as described in an example, meaning that the size of the area of contact with rubber is less than sufficient; therefore, a great reinforcing effect cannot be expected.

Examples of Patent Document 2 disclose that for improved wear resistance, addition of bacterial cellulose having a very small fiber diameter of 0.1 μm together with starch that serves as a reinforcing agent to diene rubber improves the wear resistance index as compared to addition of starch alone. In Patent Document 2, however, it is described that addition of cellulose alone has a problem with processability, and starch is added in an amount five times or more the amount of cellulose. It is considered that the starch is added in an attempt to improve the dispersibility because bacterial cellulose is dispersed to nano sizes in water but tends to aggregate in rubber, but in this case, it is expected that the reinforcing effect is balanced out by the starch, and the reinforcing effect is still not sufficient.

Patent Document 3 discloses examples in which impalpable powder cellulose fibers with an average particle size of 40 μm are introduced in a dry state into a rubber composition together with a silane coupling agent, and kneaded in a Banbury mixer. However, just by kneading in a mixer, it is difficult to break hydrogen bonds between the cellulose fibers caused in a dry state to make the cellulose fibers into fibers with a small diameter, and in this case, the cellulose fibers are considered to be dispersed in the rubber still in the form of particles with an average particle size of 40 μm. Therefore, the reinforcing effect of thin long fibers cannot be expected.

Furthermore, Patent Document 4 discloses examples in which modified microfibril cellulose with an average fiber diameter of 0.1 μm is mixed with the rubber component. The examples disclose stirring microfibril cellulose in advance in water using a rotary homogenizer to prepare a dispersion, introducing rubber latex thereinto, and mixing the resultant at 7000 rpm for 10 minutes. In this case, although a rotary homogenizer is used, the fibers tend to aggregate before water is removed, and a shearing force sufficient to disentangle the aggregated fibers is not produced at such a rotation speed. In the document, the absence of an aggregate is visually confirmed, but actually, it is not clear that at what thickness the microfibril cellulose is dispersed in the rubber.

Furthermore, Patent Document 5 proposes using as cellulose fibers obtained by graft polymerization of a diene polymer to increase the affinity and dispersibility in a rubber component. In this case, however, fibers defibrated in water are subjected to graft treatment in tetrahydrofuran (THF), and at this treatment, the fibers defibrated once in water are considered to reaggregate. If strong intermolecular hydrogen bonds are formed once, it is difficult to defibrate the fibers to nano sizes again.

Furthermore, Patent Document 6 discloses a method for manufacturing a reinforcing agent for rubber, including adding a nanofiller (inorganic filler) with an average particle size of 2 to 200 nm to an aqueous dispersion of fibrillated fibers in an amount 0.1 to 0.5 times the fiber weight, and drying the resulting mixture to give a composite of the fibrillated fibers and the nanofiller, and Patent Document 7 discloses a combination in a dry form comprising microfibrils having an average diameter less than 0.8 μm and at least one mineral particle.

RELATED ART DOCUMENTS

Patent Documents

Patent Document 1: JP H10-7811 A
Patent Document 2: JP 2005-133025 A
Patent Document 3: JP 2005-75856 A
Patent Document 4: JP 2009-84564 A
Patent Document 5: JP 2009-263417 A
Patent Document 6: JP 2011-102451 A
Patent Document 7: JP 2002-503621 W

SUMMARY OF THE INVENTION

Problems to be Solved by the Invention

As described above, various rubber compositions obtained by adding fibers to rubber, and various techniques for improving the physical properties of rubber goods including the same have hitherto been proposed, but none of them are satisfactory. For example, to provide high strength or reduce loss, it is necessary to disperse fibers uniformly in a rubber component. In combining the rubber and the fibers, however, the fibers are likely to aggregate in a mixing step or a drying step, and it is difficult to achieve uniform dispersion. Furthermore, when rubber latex is used, particles of the latex have a great influence. Thus, it has been demanded to establish a technique for solving these problems and improving the reinforcement properties of the rubber compositions.

Thus, it is an object of the present invention to solve the problems described above and provide a method for manufacturing a rubber composition, which method can give a rubber composition provided with excellent reinforcement properties by improving the dispersibility of fibers in a rubber component when the fibers are added to the rubber, a rubber composition obtained using this method, a vulcanized rubber, and a tire.

Means for Solving the Problems

The present inventors intensively studied to discover that adding a predetermined dispersant to a rubber component following a predetermined procedure can improve the dispersibility of the short fibers in the rubber component, whereby the problems described above can be solved, thereby completing the present invention.

Thus, the method for manufacturing a rubber composition according to the present invention is a method for manufacturing a rubber composition comprising short fibers, comprising a dispersion preparation step for preparing a short fiber dispersion by adding the short fibers into a liquid, a mixed dispersion preparation step for preparing a mixed dispersion by adding at least one dispersant selected from the group consisting of carbon black and inorganic compounds into the short fiber dispersion, a mixing step for mixing the mixed dispersion and rubber latex to prepare a rubber-short fiber mixed solution, and a drying step for drying the rubber-short fiber mixed solution to give a rubber composition.

The manufacturing method of the present invention may also comprise in place of the dispersion preparation step and the mixed dispersion preparation step, a mixed dispersion batch preparation step for preparing the mixed dispersion by adding the dispersant into the liquid and then further adding the short fibers thereto. It is also preferred that prior to the mixed dispersion preparation step, the dispersant be added into a liquid, which may be the same as or different from the above-described liquid, to prepare a dispersant dispersion, and in the mixed dispersion preparation step, the dispersant dispersion and the short fiber dispersion be mixed.

The rubber composition of the present invention is manufactured by the above-described method for manufacturing a rubber composition according to the present invention. In the rubber composition of the present invention, the amount of the dispersant is preferably 0.1 to 100 times the amount of the short fibers.

Furthermore, the vulcanized rubber of the present invention is obtained by vulcanizing the rubber composition of the present invention.

Furthermore, the tire of the present invention comprises the vulcanized rubber of the present invention.

EFFECTS OF THE INVENTION

According to the present invention, by employing the above structure, the dispersibility of fibers in a rubber component can be improved when the fibers are added to the rubber, whereby a method for manufacturing a rubber composition, which method can give a rubber composition having excellent reinforcement properties, a rubber composition obtained by this method, a vulcanized rubber, and a tire can be achieved.

BRIEF DESCRIPTION OF THE DRAWINGS

FIG. 1 is an SEM micrograph of Example 1;
FIG. 2 is an SEM micrograph of Comparative Example 1; and
FIG. 3 is an SEM micrograph of Comparative Example 3.

MODE FOR CARRYING OUT THE INVENTION

Embodiments of the present invention will now be described in detail.

The method for manufacturing a rubber composition according to the present invention relates to an improvement in a method for manufacturing a rubber composition comprising short fibers.

In the manufacturing method of the present invention, first, short fibers are added into a liquid to prepare a short fiber dispersion (dispersion preparation step), and at least one dispersant selected from the group consisting of carbon black and inorganic compounds is added into the resulting short fiber dispersion to prepare a mixed dispersion (mixed dispersion preparation step). Thereafter, the mixed dispersion and rubber latex are mixed to prepare a rubber-short fiber mixed solution (mixing step), and the rubber-short fiber mixed solution is dried to give a rubber composition (drying step).

According to the manufacturing method of the present invention, by adding the specific dispersant described above to a rubber component, the dispersant intervenes between the short fibers, aggregation of the short fibers can be prevented, whereby the dispersibility of the short fibers in the rubber component can be improved to improve the reinforcement properties of the resulting rubber composition.

Here, in the present invention, in place of the dispersion preparation step and the mixed dispersion preparation step, a step of adding the dispersant into the liquid and then further adding short fibers thereto to prepare a mixed dispersion can be used (mixed dispersion batch preparation step). In other words, the short fibers and the dispersant may be added to the liquid in any order. Also in this case, the dispersant intervenes between the short fibers to prevent aggregation of the short fibers, and therefore the same effect as described above can be produced.

Also in the present invention, the dispersant may be added in advance into a liquid to prepare a dispersant dispersion, and the dispersant dispersion may be mixed with a short fiber dispersion in the mixed dispersion preparation step. By adding the dispersant in the form of a dispersion to the short fiber dispersion, the dispersibility of the short fibers can be further improved. The liquid used to prepare the dispersant dispersion may be the same as or different from the liquid used to prepare the short fiber dispersion.

<Short Fibers>

There is no particular restriction on the short fibers for use in the present invention, and examples include regenerated fibers such as wood cellulose fibers and wood pulp fibers, synthetic fibers such as nylon fibers and aramid fibers, inorganic fibers such as silicon carbide fibers and carbon fibers, and steel fibers. Such short fibers, specifically, have a number average fiber length in the range of 100 nm to 1 mm, particularly 100 nm to 5 μm, a number average fiber diameter in the range of 4 nm to 10 μm, particularly 4 nm to 50 nm, and an aspect ratio in the range of 10 to 1000, particularly 20 to 250. In particular, the present invention is advantageous particularly when fine cellulose fibers (cellulose nanofibers), which are obtained by defibrating cellulose fibers and have a number average fiber diameter on the order of nanometers, are used as the short fibers. The fine cellulose fibers herein are those which have a number average fiber diameter in the range of 1 to 1000 nm and a number average fiber length in the range of 0.1 to 100 μm. The cellulose fibers from which the fine cellulose fibers are made will be described below.

<Cellulose Fibers>

The cellulose fibers may be of any type as long as they are materials from which the fine cellulose fibers are made and are substances containing cellulose (cellulose-containing substance) or a cellulose-containing substance that has been subjected to purification and the like (cellulose fiber raw material). As the cellulose fibers, cellulose may be used, and cellulose containing some impurities may be used. In particular, the cellulose fibers for use in the present invention are preferably cellulose-containing substances from which impurities are removed by purification.

Examples of cellulose-containing substances include natural celluloses, for example, woods such as softwood and hardwood; cottons such as cotton linter and cotton lint; lees of bagasse, beet pulp and the like; bast fibers of flax, ramie, jute, kenaf, and the like; leaf fibers of sisal, pineapple, and the like; petiole fibers of abaca, banana, and the like; fruit fibers of coconut and the like; plant-derived materials such as base fibers of bamboo and the like; bacterial cellulose produced by bacteria; seaweeds such as Valoniaceae and Cladophoraceae; and cysts of Ascidiacea. These natural celluloses are preferred in that they have high crystallinity and therefore provide a low coefficient of linear expansion and a high elastic modulus. In particular, cellulose fibers obtained from plant-derived materials are preferred. Bacterial cellulose is preferred in that it is likely to provide fibers with a very small fiber diameter. Furthermore, cotton is preferred in that it is also likely to provide fibers with a very small fiber diameter and that its raw material is readily available. Furthermore, woods such as softwood and hardwood also provide fibers with a very small fiber diameter, and they are economically advantageous in that they are biological resources of the largest amount on earth and sustainable resources which are said to be produced in an amount of about 70,000,000,000 tons or more per year, and therefore greatly contribute to the reduction of carbon dioxide which has an influence on global warming. The woods, when used as the cellulose fibers of the present invention, are preferably crushed into wood chips, wood flour, or the like for use.

(Purification Method)

In the present invention, the cellulose-containing substance is subjected to purification treatment (purification step), as required, to remove substances other than cellulose in the cellulose-containing substance, for example, lignin, hemicellulose, resin, and the like.

Examples of the purification method include, but are not limited to, degreasing treatment, delignification treatment, and hemicellulose removal treatment. One example is a method in which the cellulose-containing substance is degreased with benzene-ethanol, delignified by Wise's method, and then subjected to hemicellulose removal treatment with an alkali.

As the delignification treatment, in addition to the Wise's method, a method using peracetic acid (pa method), a method using a mixture of peracetic acid and persulfuric acid (pxa method), or the like is also used. In addition, bleaching treatment may optionally be performed using chlorine, ozone, sodium hypochlorite, hydrogen peroxide, chlorine dioxide, or the like.

As the purification method, common methods for manufacturing chemical pulp, for example, methods for manufacturing kraft pulp, sulfite pulp, alkaline pulp, and nitric acid pulp may be used. Alternatively, a method may be used in which the cellulose-containing substance is subjected to treatments such as delignification by heating in a digester, and further to bleaching treatment and the like.

For the purification treatment, water is commonly used as a dispersion medium, but an acid or base, or an aqueous solution of other treating agents may be used, in which case washing treatment with water may finally be performed. The cellulose-containing substance may be crushed into wood chips, wood flour, or the like, and this crush may be carried out at any timing, before, during, or after the purification treatment.

For the purification treatment of the cellulose-containing substance, an acid or base, or other treating agents are typically used, and they may be of any type. Examples include sodium carbonate, sodium hydrogen carbonate, sodium hydroxide, potassium hydroxide, magnesium hydroxide, sodium sulfide, magnesium sulfide, sodium sulfite, calcium sulfite, magnesium sulfite, ammonium sulfite, sodium sulfate, sodium thiosulfate, sodium oxide, magnesium oxide, calcium oxide, acetic acid, oxalic acid, sodium hypochlorite, calcium hypochlorite, sodium chlorite, sodium chlorate, chlorine dioxide, chlorine, sodium perchlorate, sodium thiosulfate, hydrogen peroxide, ozone, hydro sulfite, anthraquinone, dihydrodihydroxyanthracene, tetrahydroanthraquinone, anthrahydroquinone, alcohols such as ethanol, methanol, and 2-propanol, and water-soluble organic solvents such as acetone. These treating agents may be used alone or in combination of two or more.

Furthermore, two or more purification treatments may be performed using two or more treating agents, in which case it is preferable to perform washing treatment with water between the purification treatments using different treating agents.

The temperature and the pressure during the purification treatment are mot limited to particular values. The temperature is preferably selected in the range of 0° C. to 100° C., and in the case of a treatment under a pressure of over 1 atmosphere, the temperature is preferably 100° C. to 200° C.

The cellulose fibers obtained by purifying the cellulose-containing substance are typically obtained in a hydrous state (in the form of an aqueous dispersion). Examples of the cellulose fiber raw material obtained by purifying the cellulose-containing substance include hardwood kraft pulp, softwood kraft pulp, hardwood sulfite pulp, softwood sulfite pulp, bleached hardwood kraft pulp, bleached softwood kraft pulp, and linter pulp.

(Fiber Diameter)

The cellulose fibers for use in the present invention are preferably processed for use to a size in the following range, for example, by purifying, cutting, or crushing the cellulose-containing substance described above. For example, when the cellulose-containing substance is used in the form of chips or the like with a size of several centimeters, it is preferable to mechanically process the chips with a macerator, such as a refiner or a beater, to about several millimeters. The cutting or crushing of the cellulose-containing substance, when treatment such as the purification of the cellulose-containing substance described below is performed, may be carried out at any timing, before, during, or after the treatment. For example, when before the purification treatment, an impact crusher, a shear crusher, or the like may be used, and when during or after the purification treatment, a refiner or the like may be used.

The fiber diameter of the cellulose fibers for use in the present invention is not limited to a particular value, and in terms of defibration efficiency in the defibration treatment described below and handleability, the number average fiber diameter is preferably 1 µm to 1000 µm, more preferably 5 µm to 100 µm. It is noted that cellulose fibers after being typical purified have a fiber diameter of about several tens of µm (preferably 10 to 50 µm).

The number average fiber diameter can be measured by any method, and it can be determined by observing the cellulose fibers under a scanning electron microscope (SEM), a transmission electron microscope (TEM), or the like, drawing a diagonal line on the micrograph, randomly selecting 12 fibers in the vicinity of the diagonal line, and averaging the measurements of 10 fibers excluding the thickest fiber and the thinnest fiber.

(Modification)

In the present invention, the cellulose fibers for use are preferably those in which hydroxyl groups in cellulose have been modified (substituted) with any other group, specifically, those which have been derivatized by chemical modification (chemically-modified cellulose fibers), for example, those in which hydroxyl groups in cellulose have been modified (substituted) upon reaction with a chemical modifier. Chemical modification as used herein means that hydroxyl groups in cellulose are derivatized into any other group or substituted with any other group by chemical reaction. The chemical modification may be carried out before or after the purification treatment mentioned above, and from the viewpoint of efficient reaction of the chemical modifier, it is preferable to chemically modify the cellulose after the purification treatment (cellulose fiber raw material).

There is no particular limitation on the substituent introduced into hydroxyl groups in cellulose (group introduced through substitution with hydrogen atoms in hydroxyl groups) through chemical modification, and any group having a structure similar to the skeleton of a rubber component used may be selected taking into account the affinity for the rubber component. Examples include acyl groups such as acetyl, acryloyl, methacryloyl, propionyl, propioloyl, butyryl, 2-butyryl, pentanoyl, hexanoyl, heptanoyl, octanoyl, nonanoyl, decanoyl, undecanoyl, dodecanoyl, myristoyl, palmitoyl, stearoyl, and pivaloyl; isocyanate groups such as 2-methacryloyloxyethylisocyanoyl; alkyl groups such as methyl, ethyl, propyl, 2-propyl, butyl, 2-butyl, tert-butyl, pentyl, hexyl, heptyl, octyl, nonyl, decyl, undecyl, dodecyl, myristyl, palmityl, and stearyl; oxirane; oxetane; thiirane; thiethane; and carboxyl. Of these, $C_2$-$C_{12}$ acyl groups such as acetyl, acryloyl, and methacryloyl, and carboxyl are particularly preferred.

More specifically, $X_1$, $X_2$, and $X_3$ in the following formula (1) are preferably substituents listed above.

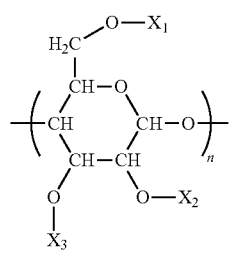

(1)

Another embodiment of $X_1$, $X_2$, and $X_3$ is an aromatic ring-containing substituent. The aromatic ring-containing substituent is a substituent derived from a hydrocarbon aromatic compound, a heterocyclic aromatic compound, or a nonbenzenoid aromatic compound. The hydrocarbon aromatic compound is a monocyclic compound of a benzene ring or a compound in which 2 to 12 benzene rings are condensed, such as benzene, naphthalene, or anthracene. The number of condensation is preferably 6 or less. The heterocyclic aromatic compound is a monocyclic compound of a 5- to 10-membered heterocyclic ring, such as furan, thiophene, pyrrole, or imidazole, or a compound in which 2 to 12 5- to 10-membered heterocyclic rings are condensed. The number of condensation is preferably 6 or less. Examples of nonbenzenoid aromatic compounds include annulenes, cyclopentadienyl anions, cycloheptatrienyl cations, tropones, metallocenes, and acepleiadylene.

Of these, substituents derived from hydrocarbon aromatic compounds and heterocyclic aromatic compounds are preferred, and substituents derived hydrocarbon aromatic compounds are more preferred. Furthermore, substituents derived from benzene, naphthalene, and anthracene are particularly preferred. In these aromatic ring-containing substituents, hydrogen in the substituent may be substituted with a $C_1$-$C_{12}$ alkyl group. Furthermore, two or more aromatic ring-containing substituents selected from the group consisting of the above-described hydrocarbon aromatic compounds, heterocyclic aromatic compounds, and nonbenzenoid aromatic compounds may be linked to each other via a single bond or a $C_1$-$C_3$ alkylene group.

For the aromatic ring-containing substituent, the linking group for bonding an aromatic ring and cellulose is not limited to a particular group as long as it results from the reaction with hydroxyl groups in cellulose. For example, the aromatic ring may be directly bonded to O (oxygen atom) in the above formula, or may be bonded to O (oxygen atom) of cellulose via a linking group such as —CO— or —CONH—, particularly preferably via —CO—.

As the aromatic ring-containing substituent of the substituent introduced into cellulose in the cellulose fibers, benzoyl, naphthoyl, anthroyl, nicotinoyl, isonicotinoyl, furoyl, and cinnamoyl are preferred, and benzoyl is particularly preferred. Introducing aldehyde or carboxyl into the primary hydroxyl group at 6-position of cellulose is one method of introducing the substituent into cellulose.

(Modifier)

The modification may be carried out by any method including reacting cellulose with a chemical modifier listed below.

Examples of chemical modifiers include acids, acid anhydrides, and halogenation reagents (which are used to form an ester group); alcohols, phenolic compounds, alkoxysilanes, phenoxysilanes, and cyclic ether compounds such as oxirane (epoxy) (which are used to form an ether group); isocyanate compounds (which are used to form a carbamate group); and ozone, chlorine gas, fluorine gas, chlorine dioxide, nitrous oxide, and N-oxyl compounds such as 2,2,6,6,-tetramethyl-piperidine-1-oxyl (TEMPO) (which are used to form a carboxyl group). Dicarboxylic acids may also be reacted. Examples of dicarboxylic acids include oxalic acid, malonic acid, succinic acid, glutaric acid, adipic acid, pimelic acid, suberic acid, azelaic acid, phthalic acid, fumaric acid, maleic acid, isophthalic acid, and terephthalic acid. These chemical modifiers may be used alone or in combination of two or more.

Examples of acids, chemical modifiers to form an ester group, include acetic acid, acrylic acid, methacrylic acid, propanoic acid, butanoic acid, 2-butanoic acid, pentane acid, benzoic acid, and naphthalenecarboxylic acid, and examples of acid anhydrides include acetic anhydride, acrylic anhydride, methacrylic anhydride, propanoic anhydride, butanoic anhydride, 2-butanoic anhydride, pentanoic anhydride, benzoic anhydride, phthalic anhydride, maleic anhydride, and succinic anhydride. Examples of halogenation reagents include acetyl halide, acryloyl halide, methacryloyl halide, propanoyl halide, butanoyl halide, 2-butanoyl halide, pentanoyl halide, benzoyl halide, naphthoyl halide, and stearoyl chloride.

Examples of alcohols, chemical modifiers to form an ether group, include methanol, ethanol, propanol, and 2-propanol. Examples of phenolic compounds include phenol and naphthol. Examples of alkoxysilanes include methoxysilane, ethoxysilane, and phenoxysilane. Examples of cyclic ethers include ethyloxirane, ethyloxetane, oxirane (epoxy), and phenyloxirane (epoxy). Examples of isocyanate compounds, chemical modifiers to form a carbamate group, include methyl isocyanate, ethyl isocyanate, propyl isocyanate, and phenyl isocyanate. Of these, acetic anhydride, acrylic anhydride, methacrylic anhydride, benzoyl halide, and naphthoyl halide are particularly preferred.

These chemical modifiers may have a functional group reactive with a rubber component at a site other than the site reactive with hydroxyl groups in cellulose. Examples of such functional groups include mercapto, alkenyl, (meth)acryloyl, and halogens. These chemical modifiers may be used alone or in combination of two or more.

(Chemical Modification Method)

The chemical modification can be carried out by any known method. Specifically, the chemical modification can be carried out by reacting cellulose with a chemical modifier according to a conventional method. In this reaction, if desired, a solvent and a catalyst may be used, and for example, heating and pressure reduction may be performed.

When cellulose fibers after purification (cellulose fiber raw material) are used, since these cellulose fibers are typically in a hydrous state, it is preferable to replace water with a reaction solvent to inhibit the reaction between the chemical modifier and water as much as possible. If the cellulose fibers are dried in order to remove water, fibrillation of the cellulose fibers is less likely to proceed in the defibrating step described below, and therefore it is not preferable to perform the drying step.

The amount of the chemical modifier, which is not limited to a particular value and varies depending on the type of the chemical modifier, is preferably at least 0.01 times, more preferably at least 0.05 times, and preferably up to 100 times, more preferably up to 50 times the number of moles of hydroxyl groups in cellulose.

As the solvent, a water-soluble organic solvent that does not inhibit esterification is preferably used. Examples of water-soluble organic solvents include organic solvents such as acetone and pyridine, and organic acids such as formic acid, acetic acid, and oxalic acid, and organic acids such as acetic acid are particularly preferred. Using an organic acid such as acetic acid enables uniform chemical modification of cellulose, facilitating the defibration described below, and the resulting cellulose fiber composite may exhibit high heat resistance and high productivity. Any other solvent than the above may be used in combination. The amount of the solvent used, although not limited to a particular value, is typically, preferably at least 0.5 times, more preferably at least 1 time, and preferably up to 200 times, more preferably up to 100 times the weight of cellulose.

As the catalyst, a basic catalyst such as pyridine, triethylamine, sodium hydroxide, or sodium acetate, or an acidic catalyst such as acetic acid, sulfuric acid, or perchloric acid is preferably used. The amount of the catalyst, which is not limited to a particular value and varies depending on the type, is typically preferably at least 0.01 times, more preferably at least 0.05 times, and preferably up to 100 times, more preferably up to 50 times the number of moles of hydroxyl groups in cellulose.

There is no particular limitation on the temperature conditions, but too high a temperature can cause yellowing of cellulose, result in a low degree of polymerization or the like, and too low a temperature may decrease the reaction rate; therefore, the temperature is preferably 10 to 130° C. The reaction time, which is also not limited to a particular value and varies depending on the chemical modifier and the chemical modification rate, is from a few minutes to several tens of hours. The chemical modification may be carried out by bringing the cellulose fibers into contact with gas. For example, the cellulose fibers are oxidized by holding them in an atmosphere containing oxidizing gas such as ozone for a given time, or exposing them to oxidizing gas stream, whereby hydroxyl groups in cellulose can be substituted.

After the chemical modification was carried out as described above, it is preferable to wash the cellulose fibers thoroughly with an organic solvent or water to terminate the reaction. The unreacted chemical modifier, if left behind, may disadvantageously cause coloration later or present a problem in combining with a resin.

(Chemical Modification Rate)

The chemical modification rate is a percentage of chemically modified hydroxyl groups in the total hydroxyl groups in cellulose, and when, for example, a monovalent acid is bonded to cellulose via an ester bond, the chemical modification rate can be determined by the titration method described below.

(Method for Measurement)

Dried chemically modified cellulose are accurately weighed to 0.05 g, and 6 ml of methanol and 2 ml of distilled water are added thereto. The resulting mixture is stirred at 60 to 70° C. for 30 minutes, and then 10 ml of 0.05 N aqueous sodium hydroxide solution is added. The resulting mixture is stirred at 60 to 70° C. for 15 minutes, and further stirred at room temperature for one day. Using phenolphthalein, the resultant is titrated with 0.02 N aqueous hydrochloric acid solution.

From the amount Z (ml) of the 0.02 N aqueous hydrochloric acid solution required for the titration, the number of moles Q of the substituent introduced through chemical modification can be determined by the following equation.

$$Q \text{ (mol)} = \{0.05 \text{ (N)} \times 10 \text{ (ml)}/1000\} - \{0.02 \text{ (N)} \times Z \text{ (ml)}/1000\}$$

The relationship between the number of moles Q of the substituent and the chemical modification rate X (mol %) is calculated by the following equation (Cellulose=$(C_6O_5H_{10})_n$=$(162.14)_n$, number of hydroxyl groups per repeating unit=3, molecular weight of OH=17). In the following equation, T is the sum of the molecular weight of the substituent and the atomic weight of oxygen (16).

$$\frac{\text{Sample quantity}}{162.14 + (T-17) \times \frac{3X}{100}} = \frac{Q}{\frac{3X}{100}}$$

This equation is solved to give the following.

$$X = \frac{100}{3} \times \frac{162.14 \times Q}{[\text{Sample quantity} - Q \times (T-17)]}$$

In the present invention, the chemical modification rate described above is not limited to a particular value, and preferably at least 1 mol %, more preferably at least 5 mol %, and particularly preferably at least 10 mol % based on the total hydroxyl groups in cellulose. It is preferably up to 65 mol %, more preferably up to 50 mol %, and still more preferably up to 40 mol %. Within this range, the fine cellulose fibers in a dispersion exhibit improved dispersion stability, and when combined with a rubber component, a rubber composition with a low coefficient of linear expansion is provided.

As a dispersion medium for dispersing the cellulose fibers, water is typically used, but an organic solvent (dispersion medium) may also be used. When an organic solvent is used, to use an aqueous dispersion of cellulose fibers, such as the cellulose fiber raw material, as the cellulose fibers, water in the aqueous dispersion may be replaced in advance with the organic solvent (solvent replacement step). The solvent can be replaced by any method, for example, a method including removing water from an aqueous dispersion containing cellulose fibers (preferably, purified or chemically modified cellulose fibers) by filtration or the like, adding thereto an organic solvent to be used in defibration, stirring and mixing the resulting mixture, and removing the organic solvent again by filtration. By repeating the addition of the organic solvent and filtration, the medium in the dispersion can be changed from water to the organic solvent. In cases where the organic solvent used is water-insoluble, the organic solvent may be replaced once with a water-soluble organic solvent, which is then replaced with a water-insoluble organic solvent.

(Defibration Method)

Defibrating the cellulose fibers described above can provide fine cellulose fibers suitable as the short fibers in the present invention. In the present invention, defibration is to disentangle a fiber typically to a smaller size. In this defibration treatment, one or more of protic polar solvents, such as water and alcoholic solvents, and aprotic polar solvents, such as ketone solvents, glycol ether solvents, amide solvents, aromatic hydrocarbons and the like, may be added. Preferred are, for example, water, amide solvents, alcoholic solvents, and ketone solvents. Such a solvent preferably has a boiling point that is not too high because the solvent will be removed in a subsequent step. The boiling point of the solvent is preferably not higher than 300° C., more preferably not higher than 200° C., and still more preferably not higher than 180° C. In terms of handleability and the like, it is preferably at least 70° C. The defibration step may be carried out by any method, specifically, for example, by placing ceramic beads with a diameter of about 1 mm into a cellulose fiber dispersion with a cellulose fiber concentration of 0.5 to 50% by mass, for example, about 1% by mass, and shaking the dispersion using a paint shaker, a bead mill, or the like to defibrate the cellulose fibers.

Other methods include passing such a raw material dispersion through a blender-type disperser or a high-speed rotating slit to apply a shearing force for defibration (high-speed rotary homogenizer), reducing the pressure rapidly from a high pressure to generate a shearing force between cellulose fibers for defibration (high-pressure homogenizer method), and using a counter-collision disperser such as Masscomizer X (manufactured by Masuko Sangyo Co., Ltd.). In other words, methods include defibration treatment using a bead mill, defibration (fibrillation) treatment through jetting, defibration treatment by a rotary defibration method, and defibration treatment through ultrasonication. In particular, treatments using a high-speed rotary homogenizer and a high-pressure homogenizer provide improved defibration efficiency.

When the defibration is carried out using the above treatments, the solids concentration of the cellulose fiber dispersion, although not limited to a particular value, is preferably at least 0.5% by mass, more preferably at least 1% by mass, and preferably not more than 99% by mass, more preferably not more than 50% by mass. When the solids concentration of the cellulose fiber dispersion subjected to the defibrating step is too low, the liquid amount is too large relative to the amount of cellulose treated, leading to low efficiency, and too high a solids concentration leads to poor flowability.

In the case of high-speed rotary homogenizers, higher peripheral speeds provide a greater shearing force, leading to higher defibration efficiency. The peripheral speed is 15 m/s or higher, preferably 30 m/s or higher, and not higher than 100 m/s, preferably not higher than 50 m/s. The peripheral speed and the number of rotations satisfy the following relationship.

Peripheral speed (m/sec)=2×radius (m) of rotary blade×π×number of rotations (rpm)/60

Therefore, when a rotary blade with a radius of 15 mm is used, the number of rotations is preferably, for example, about 10000 rpm or more, and particularly preferably about 20000 rpm or more. The upper limit of the number of rotations, although not limited to a particular value, is preferably about 30000 rpm or less from the viewpoint of apparatus performance. If the number of rotations is 5000 rpm or less, the cellulose fibers will be insufficiently defibrated. The processing time is preferably at least 1 minute, more preferably at least 5 minutes, and particularly preferably at least 10 minutes. The processing time is preferably not longer than 6 hours in terms of productivity. In cases where heat is generated by shearing, it is preferable to cool the system such that the liquid temperature will not be over 50° C. Furthermore, it is preferable to stir or circulate the raw material dispersion to receive uniform shearing.

When a high-pressure homogenizer is used, the cellulose fiber dispersion is pressurized with a pressure intensifier preferably to 30 MPa or more, more preferably to 100 MPa or more, still more preferably to 150 MPa or more, and particularly preferably to 220 MPa or more, and jetted through a nozzle with an orifice diameter of 50 μm or more to reduce the pressure such that the pressure difference is preferably 30 MPa or more, more preferably 80 MPa or more, and still more preferably 90 MPa or more. By the cleavage phenomenon caused by the pressure difference, the cellulose fibers are defibrated. In this process, when the pressure at the high-pressure condition is low or when the pressure difference between the high-pressure condition and the reduced-pressure condition is small, the defibration efficiency disadvantageously decreases, and more repeating jetting frequencies are required to achieve the desired fiber diameter. Also when the diameter of the orifice through which the cellulose fiber dispersion is jetted is too large, a sufficient defibration effect is not produced, in which case, cellulose fibers with a desired fiber diameter may not be obtained even if the jetting treatment is repeatedly performed.

The jetting of the raw material dispersion may be repeated a plurality of times as required to thereby increase the degree of fibrillation and provide cellulose fibers with a desired fiber diameter. The number of repetitions (number of passes) is typically at least once, preferably at least 3 times, and typically up to 20 times, preferably up to 15 times. A larger number of passes can increase the degree of fibrillation, but an excessively large number of passes disadvantageously leads to increased cost.

The high-pressure homogenizer apparatus is not limited to a particular one, and for example, products by Gaulin and "Starburst System" by Sugino Machine Limited can be used. The higher the high-pressure condition in jetting, the more frequently the cleavage phenomenon occurs because of a greater pressure difference, promoting further fibrillation, but the upper limit according to the specifications of the apparatus is typically up to 245 MPa. Similarly, the pressure difference between the high-pressure condition and the reduced-pressure condition is also preferably larger; in general, however, jetting is carried out from the pressurized condition made by a pressure intensifier to an atmospheric pressure, and therefore the upper limit of the pressure difference is typically up to 245 MPa.

When the diameter of the orifice through which the cellulose fiber dispersion is jetted is small, a high-pressure condition can be easily created, but an excessively small diameter leads to low jetting efficiency. The orifice diameter is preferably 50 μm or more, more preferably 100 μm or more, still more preferably 150 μm or more, and preferably 800 μm or less, more preferably 500 μm or less, still more preferably 350 μm or less. The temperature (dispersion temperature) during jetting, although not limited to a particular value, is typically 5° C. to 100° C. Too high a temperature may disadvantageously accelerate the deterioration of the apparatus, specifically, for example, a feed pump and high-pressure sealed units.

The number of jet nozzles may be either one or two, and the jetted raw material dispersion may be struck against a wall, a ball, or a ring provided on a target of jetting. When the number of nozzles is two, the cellulose fiber dispersions may be struck against each other at the target of jetting.

It is noted that a dispersion containing fine cellulose fibers can be obtained only by such a treatment using a high-pressure homogenizer, but in that case, a larger number of repetitions is necessary to achieve a sufficient degree of fibrillation, resulting in low treatment efficiency; thus, it is preferable to perform the ultrasonic treatment described below for further fibrillation after the high-pressure homogenizer treatment is performed once to about five times.

In the present invention, the cellulose concentration in the cellulose fiber dispersion after being subjected to defibration treatment and before being subjected to ultrasonic treatment is preferably at least 0.5% by mass, more preferably at least 1% by mass, and preferably not more than 50% by mass, more preferably not more than 40% by mass based on the total amount of the dispersion. When the cellulose concentration in the cellulose fiber dispersion to be irradiated with ultrasonic waves is too low, the efficiency is low, and too high a concentration increases the viscosity, resulting in ununiform defibration.

The cellulose fiber dispersion obtained through the above defibrating step, in which the fine cellulose fibers are uniformly dispersed, and aggregation and sedimentation of the fine cellulose fibers are inhibited, has excellent liquid stability.

(Cellulose I-Type Crystal)

The fine cellulose fibers obtained through the above defibrating step preferably have a cellulose I-type crystal structure. The cellulose I-type crystal, which has a higher crystalline modulus than those of other crystal structures, advantageously has a high elastic modulus, a high strength, and a low coefficient of linear expansion. The fine cellulose fibers can be identified as having the I-type crystal structure from a diffraction profile determined by wide-angle X-ray diffractometry, wherein there are two typical peaks at $2\theta$=approximately 14 to 17° and $2\theta$=approximately 22 to 23°.

(Number Average Fiber Diameter, Number Average Fiber Length, and Aspect Ratio of Fine Cellulose Fibers)

The number average fiber diameter, number average fiber length, and aspect ratio of fine cellulose fibers in the cellulose fiber dispersion obtained by the method described above can be determined by drying off the dispersion medium in the cellulose fiber dispersion, and then observing and measuring the fine cellulose fibers by SEM, TEM, or the like. The number average fiber diameter of the defibrated fine cellulose fibers obtained by the present invention, to provide the resulting composite with a more excellent low linear expansivity, is preferably 400 nm or less, more preferably 100 nm or less, and still more preferably 50 nm or less. The lower limit of the number average fiber diameter is typically at least 4 nm. When the number average fiber diameter is smaller than this range, the I-type crystal of cellulose is broken, and the strength and the elastic modulus of the fibers themselves are low, making it difficult to produce a reinforcing effect. When the number average fiber diameter is larger than the above range, the area of contact with rubber is small, which results in a small reinforcing effect. The number average fiber diameter, the number average fiber length, and the aspect ratio are values obtained by observing the fine cellulose fibers by SEM, TEM, or the like, drawing a diagonal line on the micrograph, randomly selecting 14 fibers in the vicinity of the diagonal line, measuring the fiber diameter, fiber length, and aspect ratio of at least 10 fibers excluding the thickest fiber, the thinnest fiber, the longest fiber, and the shortest fiber, and averaging the measurements.

The fine cellulose fiber content in the cellulose fiber dispersion, which is adjusted as appropriate according to the amount of cellulose fibers (starting material) used, in terms of dispersion stability, is preferably at least 0.5% by mass, more preferably at least 1% by mass, and preferably not more than 50% by mass, more preferably not more than 40% by mass, still more preferably not more than 30% by mass based on the total amount of the cellulose fiber dispersion. In the present invention, this cellulose fiber dispersion can be suitably used as a short fiber dispersion.

<Rubber Component>

Rubber components are roughly classified into natural rubber and synthetic rubber, and in the present invention, these may be used either alone or in combination. The synthetic rubber can be selected from known ones depending on the intended use, and examples include butyl rubber (IIR), butyl bromide rubber (Br-IIR), nitrile rubber (NBR), styrene/butadiene rubber (SBR), butadiene rubber (BR), isoprene rubber (IR), acrylonitrile-butadiene rubber, and chloroprene rubber.

<Dispersant>

As the dispersant for use in the present invention, at least one selected from the group consisting of carbon black and inorganic compounds is used, which are materials that themselves do not aggregate in a liquid such as water and can be dispersed into short fibers. There is no particular limitation on the carbon black, and it may be appropriately selected from those which are commonly used in the rubber industry, and examples include SRF, GPF, FEF, HAF, ISAF, and SAF. There is no particular limitation also on the inorganic compound, and examples include silica, sodium silicate, clay, aluminum silicate, calcium carbonate, aluminum hydroxide, titanium oxide, magnesium silicate, magnesium oxide, alumina, and alumina hydrate. The dispersant is more preferably bindable to surface groups of short fibers. In the present invention, particularly among the foregoing, carbon black can be suitably used as the dispersant.

The rubber composition in the present invention can be prepared, specifically, by the following procedure. First, short fibers, in particular, fine cellulose fibers are added into a liquid to prepare a short fiber dispersion (dispersion preparation step). There is no particular limitation on the method of preparing the short fiber dispersion, and it can be prepared by mixing the components used. As the liquid into which short fibers, particularly, cellulose fibers are added, the same water or organic solvent as used for the defibration treatment described above can be used as appropriate. When fine cellulose fibers are used as the short fibers, the cellulose fiber dispersion containing the fine cellulose fibers obtained by the defibration treatment described above can be used as it is as the short fiber dispersion.

The dispersant described above was then added into the short fiber dispersion obtained above to prepare a mixed dispersion (mixed dispersion preparation step). The amount of the dispersant in the mixed dispersion is preferably 0.1 to 100 times, more preferably 5 to 30 times the amount of short fibers. Too small an amount of the dispersant may not produce a sufficient short fiber dispersibility-improving effect, and too large an amount of the dispersant may affect the break properties and loss, both of which are unfavorable. In this step, also as a liquid in the case where the dispersant is added into the liquid to prepare a dispersant dispersion for use, the same water or organic solvent as used for the defibration treatment described above can be used as appropriate.

The mixed dispersion is then mixed with rubber latex to prepare a rubber-short fiber mixed solution (mixing step). There is no particular limitation on the method of preparing the rubber-short fiber mixed solution, and it can be prepared by mixing the components used. Specifically, for example, the rubber-short fiber mixed solution can be prepared by stirring a mixture of the mixed dispersion and rubber latex using a homogenizer. The stirring with a homogenizer can be carried out, for example, under the conditions of 10000 to 20000 rpm for 5 to 20 minutes.

In the rubber-short fiber mixed solution obtained as described above, the short fibers are uniformly dispersed, and therefore the rubber-short fiber mixed solution, in which aggregation and sedimentation of the short fibers are inhibited, has excellent liquid stability. Furthermore, as described below, the rubber composition and the vulcanized rubber obtained using the rubber-short fiber mixed solution containing the short fibers and the rubber component, in which the short fibers are uniformly dispersed in the rubber component, each exhibit a high elastic modulus and a low loss tangent.

(Other Additives)

To the rubber-short fiber mixed solution described above, other compounding agents conventionally used in the rubber industry may be added as required, in addition to the short fibers, the dispersant, and the rubber component. For example, other reinforcing agents include inorganic and organic fillers such as silica particles, carbon black, and fibers, silane coupling agents, vulcanizing agents as described below, vulcanization accelerators and vulcanization acceleration aids such as stearic acid, amines, zinc oxide, and magnesium oxide, oil, curing resin, wax, and age resistors. These additives, which are typically added to the rubber-short fiber mixed solution, may be added in advance, for example, to a mixed dispersion.

(Vulcanizing Agent)

As the vulcanizing agent, an organic peroxide or a sulfur-based vulcanizing agent can be used. Various organic peroxides conventionally used in the rubber industry can be used, and particularly preferred are dicumyl peroxide, t-butylperoxy benzene, and di-t-butylperoxy-diisopropylbenzene. Examples of sulfur-based vulcanizing agents include sulfur and morpholine disulfide, and sulfur is particularly preferred. These vulcanizing agents may be used alone or in combination of two or more.

The amount of the vulcanizing agent in the rubber-short fiber mixed solution described above, in the case of sulfur, is about 7.0 parts by mass or less, preferably 6.0 parts by mass or less, and 1.0 parts by mass or more, preferably 3.0 parts by mass or more, particularly 4.0 parts by mass or more based on 100 parts by mass of the rubber component.

The rubber-short fiber mixed solution is then dried to give the rubber composition of the present invention (drying step). In the drying step, the rubber-short fiber mixed solution may be dried, for example, in a vacuum oven at 50 to 150° C. for 1 to 16 hours.

In the present invention, if desired, the rubber composition obtained through the drying step may be further mixed with the rubber component and the above-described various compounding agents using a known method, such as a rubber kneader, and then the resulting mixture is molded and vulcanized according to a conventional method, whereby a vulcanized rubber containing fine cellulose fibers and a vulcanized rubber component can be obtained. For the molding before the vulcanizing step, various methods can be used. For example, the rubber composition may be applied to a substrate as a coating, cast into a mold, or extruded, and there is no particular limitation.

For example, when the vulcanized rubber is used for a tire, the rubber composition is appropriately kneaded, extruded in an unvulcanized state into a shape of a tire member for a desired application, and molded together with other tire members with a tire molding machine using a conventional method to form an unvulcanized tire (green tire). The unvulcanized tire is hot-pressed in a vulcanizer, whereby a tire can be obtained including a vulcanized rubber obtained by vulcanizing the rubber composition of the present invention. This vulcanized rubber has excellent break properties, and thus, the tire including the same will have a low rolling resistance, good controllability, and durability.

There is no particular limitation on the vulcanization conditions for preparing a vulcanized rubber, and temperatures and times that can process the rubber component into a vulcanized rubber may be used. In particular, the heating temperature is preferably 60° C. or higher, more preferably 100° C. or higher, at which temperatures an organic solvent can be volatilized off, and preferably not higher than 250° C., more preferably not higher than 200° C., at which temperatures decomposition of fine cellulose fibers is prevented. The heating time, in terms of, for example, productivity, is at least 5 minutes, preferably at least 10 minutes, more preferably at least 15 minutes, and preferably not longer than 180 minutes. The vulcanization of the rubber composition may be carried out for a plurality of times varying temperatures and heating times.

<Vulcanized Rubber>

(Number Average Fiber Diameter of Fine Cellulose Fibers)

The number average fiber diameter of the fine cellulose fibers in the vulcanized rubber obtained by the method described above can be determined by cutting the vulcanized rubber as required, and observing and measuring the vulcanized rubber by SEM, TEM, or the like.

The number average fiber diameter of the fine cellulose fibers, to provide the resulting vulcanized rubber with a more excellent low linear expansivity, is preferably 400 nm or less, more preferably 100 nm or less, and still more preferably 50 nm or less. The lower limit of the number average fiber diameter is typically at least 4 nm. When the number average fiber diameter is smaller than this range, the I-type crystal structure of cellulose cannot be maintained, and the strength and the elastic modulus of the fibers themselves are low, making it difficult to produce a reinforcing effect. When the number average fiber diameter is larger than the above range, the area of contact with rubber is small, which results in a small reinforcing effect. The number average fiber diameter is a value obtained by observing the fine cellulose fibers by SEM, TEM, or the like, drawing a diagonal line on the micrograph, randomly selecting 12 fibers in the vicinity of the diagonal line, measuring 10 fibers excluding the thickest fiber and the thinnest fiber, and averaging the measurements.

(Fine Cellulose Fiber Content)

The fine cellulose fiber content in the vulcanized rubber is appropriately adjusted depending on the intended use, and from the viewpoint of reinforcement properties, it is preferably at least 0.5% by mass, more preferably at least 1% by mass, and preferably not more than 50% by mass, more preferably not more than 40% by mass, still more preferably not more than 30% by mass based on the total amount of the vulcanized rubber.

The mass ratio of the fine cellulose fibers to the rubber component contained in the vulcanized rubber is the same as the mass ratio of the cellulose fibers to the rubber component in the rubber-short fiber mixed solution described above. A small fiber content does not produce a sufficient reinforcing effect, whereas a large fiber content may reduce the processability of the rubber.

(Dispersed State of Fine Cellulose Fibers)

In the vulcanized rubber of the present invention thus obtained, fine cellulose fibers having a number average fiber diameter of 4 to 400 nm, preferably 4 to 100 nm, and more preferably 4 to 50 nm are stably dispersed in a vulcanized rubber component without forming an aggregate. Therefore, the vulcanized rubber can achieve a high elastic modulus due to the reinforcing effect of the fine cellulose fibers, and at the same time, can achieve high breaking elongation as the small fiber diameter does not prevent the intrinsic elongation of the rubber. In other words, the vulcanized rubber of the present invention has high durability and high rigidity as a reinforcing rubber, and is suitably used for rubber goods such as tires. The dispersed state of the fine cellulose fibers in the vulcanized rubber of the present invention can be determined by observing a cross-section structure by SEM or the like.

In the tire of the present invention, it is only required that the vulcanized rubber of the present invention be used as some members of the tire, and there is no particular limitation, for example, on materials used for other specific structures or other members. Specifically, for example, in the tire of the present invention, the vulcanized rubber can be suitably applied to members such as belts, treads, sidewalls, bead fillers, carcasses, and chafers.

EXAMPLES

The present invention will now be described in more detail with reference to examples.

Example 1

First, 500 mL of distilled water was added to 3.7 g of carbon black serving as a dispersant, and the resulting mixture was stirred at 11000 rpm for 10 minutes using a homogenizer (ULTRA-TURRAX manufactured by IKA) to prepare a carbon black slurry. The carbon black slurry and a carboxylic acid-modified fine cellulose fiber slurry (liquid: water, number average fiber length: 360 nm, number average fiber diameter: 8 nm, aspect ratio: 45, available from Oji Paper Co., Ltd.) were then stirred at 11000 rpm for 10 minutes using a homogenizer to give a masterbatch. Further to this masterbatch, natural rubber (NR) latex (field latex, pH: 10.8, solids concentration: 20% by mass) was added, and the resulting mixture was stirred at 11000 rpm for 10 minutes using the above homogenizer and then dried in a vacuum oven at 60° C. for 6 hours to give a dry rubber composition A. The amounts of the components in the dry rubber composition A obtained were as follows: fine cellulose fibers:5 parts by mass, carbon black:37 parts by mass (based on 100 parts by mass of the rubber component).

Comparative Example 1

Natural rubber latex alone without being mixed with the carbon black slurry and the carboxylic acid-modified fine cellulose fiber slurry in Example 1 was dried in a vacuum oven at 60° C. for 6 hours to give a dry rubber composition B. At the subsequent rubber kneading, 37 parts by mass of carbon black was added to 100 parts by mass of the dry rubber composition B.

Comparative Example 2

Natural rubber latex alone without being mixed with the carbon black slurry and the carboxylic acid-modified fine cellulose fiber slurry in Example 1 was dried in a vacuum oven at 60° C. for 6 hours to give a dry rubber composition B. At the subsequent rubber kneading, 42 parts by mass of carbon black was added to 100 parts by mass of the dry rubber composition B.

Comparative Example 3

The same procedure as in Example 1 was repeated except that the carbon black slurry was not added to give a dry rubber composition C. At the subsequent rubber kneading, 37 parts by mass of carbon black was added to 100 parts by mass of the dry rubber composition C.

To each of the dry rubber compositions obtained above, other components were added, and normal kneading was performed using a laboratory kneader. The resulting mixtures were press vulcanized to give vulcanized rubber sheets of Examples and Comparative Examples. The vulcanized rubber sheets obtained were each observed by SEM to check the dispersed state. FIGS. 1 to 3 are SEM micrographs of Example 1 and Comparative Examples 1 and 3, respectively.

The vulcanized rubber sheets obtained were then subjected to a tensile test in accordance with ASTM D412 to measure the strength at break (Tb) and the breaking elongation (Eb). The measurements were expressed by the product of Tb and Eb (Eb×Tb) as an index number taking the value of Comparative Example 3 as 100. Larger index numbers indicate better results with more excellent reinforcement properties. The results are shown in Table 1 below.

TABLE 1

|  |  | Example 1 | Comparative Example 1 | Comparative Example 2 | Comparative Example 3 |
|---|---|---|---|---|---|
| Components (parts by mass) | NR (dried rubber latex) | — | 100 | 100 | — |
|  | NR (rubber latex) | 100 | — | — | 100 |
|  | Cellulose fibers (surface treated) | 5 | — | — | 5 |
|  | Carbon black | — | 37 | 42 | 37 |
|  | Carbon black slurry | 37 | — | — | — |
|  | Zinc white | 2.5 | 2.5 | 2.5 | 2.5 |
|  | Stearic acid | 2 | 2 | 2 | 2 |
|  | Vulcanization accelerator*1 | 1.5 | 1.5 | 1.5 | 1.5 |
|  | Age resistor*2 | 2 | 2 | 2 | 2 |
|  | Sulfur | 1.5 | 1.5 | 1.5 | 1.5 |
| Dispersant/short fiber (surface treated) ratio (—) |  | 7.4 | — | — | 7.4 |
| Eb × Tb (index number) |  | 108 | 94 | 86 | 100 |

*1)Vulcanization accelerator: Nocceler NS-P available from Ouchi Shinko Chemical Industrial Co., Ltd.
*2)Age resistor: Nocrac 6C available from Ouchi Shinko Chemical Industrial Co., Ltd.

As shown in the above table, it was confirmed that the rubber composition of Example obtained by the manufacturing method according to the present invention had good dispersibility of cellulose fibers, and had excellent reinforcement properties compared to the rubber compositions of Comparative Examples obtained by conventional methods.

Example 2

First, 500 mL of distilled water was added to 4.5 g of carbon black (ISAF) serving as a dispersant, and the resulting mixture was stirred at 11000 rpm for 10 minutes using a homogenizer (ULTRA-TURRAX manufactured by IKA) to prepare a carbon black (ISAF) slurry. The carbon black (ISAF) slurry and a phosphoric acid-modified fine cellulose fiber slurry (liquid: water (1 wt %), number average fiber length: 5 nm, number average fiber diameter: 800 nm, aspect ratio: 400, available from Oji Paper Co., Ltd.) were then stirred at 11000 rpm for 10 minutes using a homogenizer to give a masterbatch. Further to this masterbatch, natural rubber (NR) latex (field latex, pH: 10.8, solids concentration: 20% by mass) was added, and the resulting mixture was stirred at 11000 rpm for 10 minutes using the above homogenizer and then dried in a vacuum oven at 60° C. for 6 hours to give a dry rubber composition. The amounts of the components in the dry rubber composition obtained were as follows: fine cellulose fibers:5 parts by mass, carbon black (ISAF):45 parts by mass (based on 100 parts by mass of the rubber component).

Comparative Example 4

Natural rubber latex alone without being mixed with the carbon black (ISAF) slurry and the phosphoric acid-modified fine cellulose fiber slurry in Example 2 was dried in a vacuum oven at 60° C. for 6 hours to give a dry rubber composition. At the subsequent rubber kneading, 45 parts by mass of carbon black (ISAF) was added to 100 parts by mass of the dry rubber composition.

Comparative Example 5

Natural rubber latex alone without being mixed with the carbon black (ISAF) slurry and the phosphoric acid-modified fine cellulose fiber slurry in Example 2 was dried in a vacuum oven at 60° C. for 6 hours to give a dry rubber composition. At the subsequent rubber kneading, 50 parts by mass of carbon black (ISAF) was added to 100 parts by mass of the dry rubber composition.

Comparative Example 6

The same procedure as in Example 2 was repeated except that the carbon black (ISAF) slurry was not added to give a dry rubber composition. At the subsequent rubber kneading, 45 parts by mass of carbon black (ISAF) was added to 100 parts by mass of the dry rubber composition.

Comparative Example 7

The same procedure as in Comparative Example 6 was repeated except that a carboxylic acid-modified fine cellulose fiber slurry (liquid: water, number average fiber length: 360 nm, number average fiber diameter: 8 nm, aspect ratio: 45, available from Oji Paper Co., Ltd.) was substituted for the phosphoric acid-modified fine cellulose fiber slurry to give a dry rubber composition. At the subsequent rubber kneading, 45 parts by mass of carbon black (ISAF) was added to 100 parts by mass of the dry rubber composition.

Comparative Example 8

Natural rubber latex alone without being mixed with the carbon black (ISAF) slurry and the phosphoric acid-modified fine cellulose fiber slurry in Example 2 was dried in a vacuum oven at 60° C. for 6 hours to give a dry rubber composition. The same procedure was repeated except that the carbon black (ISAF) slurry and the carboxylic acid-modified fine cellulose fiber slurry were added to the dry rubber composition at the subsequent rubber kneading to give a dry rubber composition. The amounts of the components in the dry rubber composition obtained were as follows: fine cellulose fibers:5 parts by mass, carbon black (ISAF):45 parts by mass (based on 100 parts by mass of the rubber component).

Comparative Example 9

First, 500 mL of distilled water was added to 4.5 g of titanium oxide serving as a dispersant, and the resulting mixture was stirred at 11000 rpm for 10 minutes using a homogenizer (ULTRA-TURRAX manufactured by IKA) to prepare a titanium oxide slurry. The same procedure as in Comparative Example 8 was repeated except that the titanium oxide slurry was substituted for the carbon black (ISAF) slurry to give a dry rubber composition. The amounts of the components in the dry rubber composition obtained were as follows: fine cellulose fibers:5 parts by mass, titanium oxide:45 parts by mass (based on 100 parts by mass of the rubber component).

Comparative Example 10

First, 500 mL of distilled water was added to 4.5 g of clay serving as a dispersant, and the resulting mixture was stirred at 11000 rpm for 10 minutes using a homogenizer (ULTRA-TURRAX manufactured by IKA) to prepare a clay slurry. The same procedure as in Comparative Example 8 was repeated except that the clay slurry was substituted for the carbon black (ISAF) slurry to give a dry rubber composition. The amounts of the components in the dry rubber composition obtained were as follows: fine cellulose fibers:5 parts by mass, clay:45 parts by mass (based on 100 parts by mass of the rubber component).

Comparative Example 11

The same procedure as in Example 2 was repeated except that the phosphoric acid-modified fine cellulose fiber slurry was not added to give a dry rubber composition. At the subsequent rubber kneading, 5 parts by mass of carboxylic acid-modified fine cellulose fibers dried in a vacuum oven at 60° C. for 6 hours was added to the dry rubber composition. As the dried carboxylic acid-modified fine cellulose fibers, those which were triturated were used.

Example 3

The same procedure as in Example 2 was repeated except that a carboxylic acid-modified fine cellulose fiber slurry (liquid: water, number average fiber length: 360 nm, number average fiber diameter: 8 nm, aspect ratio: 45, available from Oji Paper Co., Ltd.) was substituted for the phosphoric acid-modified fine cellulose fiber slurry to give a dry rubber composition. The amounts of the components in the dry rubber composition obtained were as follows: fine cellulose fibers:5 parts by mass, carbon black (ISAF):45 parts by mass (based on 100 parts by mass of the rubber component).

To each of the dry rubber compositions obtained above, other components were added, and normal kneading was performed using a laboratory kneader. The resulting mixtures were press vulcanized to give vulcanized rubber sheets of Examples and Comparative Examples. The vulcanized rubber sheets obtained were then evaluated in the same manner as in Example 1 and other examples. The results are expressed as an index number taking the value of Comparative Example 7 as 100. The results are shown in Tables 2 and 3 below.

TABLE 2

|  |  | Example 2 | Comparative Example 4 | Comparative Example 5 | Comparative Example 6 | Comparative Example 7 | Comparative Example 8 |
|---|---|---|---|---|---|---|---|
| Components (parts by mass) | NR (dried rubber latex) | — | 100 | 100 | — | — | 100 |
|  | NR (rubber latex) | 100 | — | — | 100 | 100 | — |
|  | Surface treated cellulose fibers (carboxylic acid-modified) | — | — | — | — | 5 | 5 |
|  | Surface treated cellulose fibers (phosphoric acid-modified) | 5 | — | — | 5 | — | — |
|  | Carbon black (ISAF) | — | 45 | 50 | 45 | 45 | — |
|  | Dispersant Carbon black (ISAF) slurry | 45 | — | — | — | — | 45 |
|  | Titanium oxide slurry | — | — | — | — | — | — |
|  | Clay slurry | — | — | — | — | — | — |
|  | Zinc white | 2.5 | 2.5 | 2.5 | 2.5 | 2.5 | 2.5 |
|  | Stearic acid | 2 | 2 | 2 | 2 | 2 | 2 |
|  | Vulcanization accelerator*[1] | 1.5 | 1.5 | 1.5 | 1.5 | 1.5 | 1.5 |
|  | Age resistor*[2] | 2 | 2 | 2 | 2 | 2 | 2 |
|  | Sulfur | 1.5 | 1.5 | 1.5 | 1.5 | 1.5 | 1.5 |
| Dispersant/short fiber (surface treated) ratio (—) |  | 9 | — | — | 9 | 9 | 9 |
| Eb × Tb (index number) |  | 115 | 101 | 88 | 85 | 100 | 48 |

TABLE 3

|  |  | Comparative Example 9 | Comparative Example 10 | Comparative Example 11 | Example 3 |
|---|---|---|---|---|---|
| Components (parts by mass) | NR (dried rubber latex) | 100 | 100 | — | — |
|  | NR (rubber latex) | — | — | 100 | 100 |
|  | Surface treated cellulose fibers (carboxylic acid-modified) | 5 | 5 | 5* | 5* |
|  | Surface treated cellulose fibers (phosphoric acid-modified) | — | — | — | — |
|  | Carbon black (ISAF) | — | — | — | — |

TABLE 3-continued

|  |  | Comparative Example 9 | Comparative Example 10 | Comparative Example 11 | Example 3 |
|---|---|---|---|---|---|
| Dispersant | Carbon black (ISAF) slurry | — | — | 45 | 45 |
|  | Titanium oxide slurry | 45 | — | — | — |
|  | Clay slurry | — | 45 | — | — |
|  | Zinc white | 2.5 | 2.5 | 2.5 | 2.5 |
|  | Stearic acid | 2 | 2 | 2 | 2 |
|  | Vulcanization accelerator[*1] | 1.5 | 1.5 | 1.5 | 1.5 |
|  | Age resistor[*2] | 2 | 2 | 2 | 2 |
|  | Sulfur | 1.5 | 1.5 | 1.5 | 1.5 |
| Dispersant/short fiber (surface treated) ratio (—) |  | 9 | 9 | 9 | 9 |
| Eb × Tb (index number) |  | 43 | 45 | 53 | 122 |

*In Comparative Example 11, NR latex and a carbon black slurry were mixed and dried, and dried cellulose fibers were added thereto at kneading. In Example 3, a mixture of NR latex, cellulose fibers, and a carbon slurry was dried.

Examples 4 to 8

The same procedure as in Example 3 was repeated except that the amounts of the components were changed as shown in the tables below to give a dry rubber composition.

Comparative Examples 12 to 16

The same procedure as in Comparative Example 7 was repeated except that the amounts of the components were changed as shown in the tables below to give a dry rubber composition.

Example 9

First, 500 mL of distilled water was added to 4.5 g of carbon black (GPF) serving as a dispersant, and the resulting mixture was stirred at 11000 rpm for 10 minutes using a homogenizer (ULTRA-TURRAX manufactured by IKA) to prepare a carbon black (GPF) slurry. The same procedure as in Example 3 was repeated except that the carbon black (GPF) slurry was substituted for the carbon black (ISAF) slurry to give a dry rubber composition.

Comparative Example 17

The same procedure as in Comparative Example 7 was repeated except that carbon black (GPF) was substituted for the carbon black (ISAF) to give a dry rubber composition.

Example 10

First, 500 mL of distilled water was added to 4.5 g of carbon black (HAF) serving as a dispersant, and the resulting mixture was stirred at 11000 rpm for 10 minutes using a homogenizer (ULTRA-TURRAX manufactured by IKA) to prepare a carbon black (HAF) slurry. The same procedure as in Example 3 was repeated except that the carbon black (HAF) slurry was substituted for the carbon black (ISAF) slurry to give a dry rubber composition.

Comparative Example 18

The same procedure as in Comparative Example 7 was repeated except that carbon black (HAF) was substituted for the carbon black (ISAF) to give a dry rubber composition.

To each of the dry rubber compositions obtained above, other components were added, and normal kneading was performed using a laboratory kneader. The resulting mixtures were press vulcanized to give vulcanized rubber sheets of Examples and Comparative Examples. The vulcanized rubber sheets obtained were then evaluated in the same manner as in Example 1 and other examples. The results are expressed as an index number taking the respective corresponding Comparative Examples as 100: Comparative Example 12 for Example 4, Comparative Example 13 for Example 5, Comparative Example 14 for Example 6, Comparative Example 15 for Example 7, Comparative Example 16 for Example 8, Comparative Example 17 for Example 9, and Comparative Example 18 for Example 10. The result are shown in Tables 4 and 5 below.

TABLE 4

|  |  | Example 4 | Comparative Example 12 | Example 5 | Comparative Example 13 | Example 6 | Comparative Example 14 | Example 7 | Comparative Example 15 |
|---|---|---|---|---|---|---|---|---|---|
| Components (parts by mass) | NR (dried rubber latex) | — | — | — | — | — | — | — | — |
|  | NR (rubber latex) | 100 | 100 | 100 | 100 | 100 | 100 | 100 | 100 |
|  | Surface treated cellulose fibers (carboxylic acid-modified) | 40 | 40 | 8 | 8 | 1 | 1 | 0.4 | 0.4 |
|  | Surface treated cellulose fibers (phosphoric acid-modified) | — | — | — | — | — | — | — | — |
|  | Carbon black (ISAF) | — | 3 | — | 40 | — | 40 | — | 40 |
|  | Dispersant Carbon black (ISAF) slurry | 3 | — | 40 | — | 40 | — | 40 | — |
|  | Titanium oxide slurry | — | — | — | — | — | — | — | — |
|  | Clay slurry | — | — | — | — | — | — | — | — |
|  | Zinc white | 2.5 | 2.5 | 2.5 | 2.5 | 2.5 | 2.5 | 2.5 | 2.5 |
|  | Stearic acid | 2 | 2 | 2 | 2 | 2 | 2 | 2 | 2 |
|  | Vulcanization accelerator[*1] | 1.5 | 1.5 | 1.5 | 1.5 | 1.5 | 1.5 | 1.5 | 1.5 |

TABLE 4-continued

|  | Example 4 | Comparative Example 12 | Example 5 | Comparative Example 13 | Example 6 | Comparative Example 14 | Example 7 | Comparative Example 15 |
|---|---|---|---|---|---|---|---|---|
| Age resistor*2 | 2 | 2 | 2 | 2 | 2 | 2 | 2 | 2 |
| Sulfur | 1.5 | 1.5 | 1.5 | 1.5 | 1.5 | 1.5 | 1.5 | 1.5 |
| Dispersant/short fiber (surface treated) ratio (—) | 0.08 | 0.08 | 5 | 5 | 40 | 40 | 100 | 100 |
| Eb × Tb (index number) | 103 | 100 | 113 | 100 | 108 | 100 | 107 | 100 |

TABLE 5

|  |  | Example 8 | Comparative Example 16 | Example 9 | Comparative Example 17 | Example 10 | Comparative Example 18 |
|---|---|---|---|---|---|---|---|
| Components (parts by mass) | NR (dried rubber latex) | — | — | — | — | — | — |
|  | NR (rubber latex) | 100 | 100 | 100 | 100 | 100 | 100 |
|  | Surface treated cellulose fibers (carboxylic acid-modified) | 0.2 | 0.2 | 5 | 5 | 5 | 5 |
|  | Surface treated cellulose fibers (phosphoric acid-modified) | — | — | — | — | — | — |
|  | Carbon black (ISAF) | — | 40 | — | — | — | — |
|  | Carbon black(GPF) | — | — | — | 45 | — | — |
|  | Carbon black(HAF) | — | — | — | — | — | 45 |
| Dispersant | Carbon black (ISAF) slurry | 40 | — | — | — | — | — |
|  | Carbon black(GPF) slurry | — | — | 45 | — | — | — |
|  | Carbon black(HAF) slurry | — | — | — | — | 45 | — |
|  | Titanium oxide slurry | — | — | — | — | — | — |
|  | Clay slurry | — | — | — | — | — | — |
|  | Zinc white | 2.5 | 2.5 | 2.5 | 2.5 | 2.5 | 2.5 |
|  | Stearic acid | 2 | 2 | 2 | 2 | 2 | 2 |
|  | Vulcanization accelerator*1 | 1.5 | 1.5 | 1.5 | 1.5 | 1.5 | 1.5 |
|  | Age resistor*2 | 2 | 2 | 2 | 2 | 2 | 2 |
|  | Sulfur | 1.5 | 1.5 | 1.5 | 1.5 | 1.5 | 1.5 |
| Dispersant/short fiber (surface treated) ratio (—) |  | 200 | 200 | 9 | 9 | 9 | 9 |
| Eb × Tb (index number) |  | 103 | 100 | 108 | 100 | 110 | 100 |

As shown in the above table, it was confirmed that the rubber compositions of Examples obtained by the manufacturing method according to the present invention had good dispersibility of cellulose fibers, and had excellent reinforcement properties compared to the rubber compositions of Comparative Examples obtained by conventional methods.

The invention claimed is:

1. A tire comprising a vulcanized rubber obtained by vulcanizing a rubber composition comprising short fibers, the rubber composition being manufacturing by a method comprising:
   a dispersion preparation step for preparing a short fiber dispersion by adding the short fibers into a liquid;
   a mixed dispersion preparation step for preparing a mixed dispersion by adding at least one dispersant selected from the group consisting of carbon black and inorganic compounds into the short fiber dispersion;
   a mixing step for mixing the mixed dispersion and rubber latex to prepare a rubber-short fiber mixed solution; and
   a drying step for dying the rubber-short fiber mixed solution to give a rubber composition,
   wherein the short fiber content in the short fiber dispersion is 0.5-50% by mass based on the total amount of the fiber dispersion, the short fibers have a number average fiber length in the range of 100 nm to 1 mm, and the amount of short fibers in the rubber composition is 0.2-40 parts by mass based on 100 parts by mass of the rubber.

2. The tire according to claim 1, wherein the method for manufacturing the rubber composition comprises in place of the dispersion preparation step and the mixed dispersion preparation step, a mixed dispersion batch preparation step for preparing the mixed dispersion by adding the dispersant into the liquid and then further adding the short fibers thereto.

3. The tire according to claim 1, wherein in the method for manufacturing the rubber composition prior to the mixed dispersion preparation step, the dispersant is added into a liquid, which may be the same as or different from the above-described liquid, to prepare a dispersant dispersion, and in the mixed dispersion preparation step, the dispersant dispersion and the short fiber dispersion are mixed.

4. The tire according to claim 1, wherein in the rubber composition the amount of the dispersant is 0.1 to 100 times the amount of the short fibers.

* * * * *